(12) United States Patent
Ohkawa

(10) Patent No.: US 12,287,994 B2
(45) Date of Patent: Apr. 29, 2025

(54) PRINTING CONTROL APPARATUS, NON-TRANSITORY COMPUTER READABLE MEDIUM STORING PROGRAM, AND PRINTING CONTROL METHOD

(71) Applicant: FUJIFILM Business Innovation Corp., Tokyo (JP)

(72) Inventor: Kazuhiro Ohkawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 367 days.

(21) Appl. No.: 17/715,971

(22) Filed: Apr. 8, 2022

(65) Prior Publication Data

US 2023/0129677 A1 Apr. 27, 2023

(30) Foreign Application Priority Data

Oct. 27, 2021 (JP) .................................. 2021-175541

(51) Int. Cl.
*G06F 15/00* (2006.01)
*G06F 3/12* (2006.01)
*G06K 15/02* (2006.01)
*H04N 1/00* (2006.01)

(52) U.S. Cl.
CPC ............ *G06F 3/1234* (2013.01); *G06F 3/121* (2013.01); *G06F 3/1267* (2013.01); *G06F 3/1274* (2013.01); *G06K 15/1809* (2013.01); *H04N 1/00427* (2013.01); *H04N 1/0048* (2013.01)

(58) Field of Classification Search
None
See application file for complete search history.

(56) References Cited

U.S. PATENT DOCUMENTS

| | | | |
|---|---|---|---|
| 8,687,208 B2 | 4/2014 | Nakatsuka | |
| 2013/0208292 A1* | 8/2013 | Akari | G06F 3/1267 358/1.13 |
| 2014/0176999 A1* | 6/2014 | Umezawa | H04N 1/00774 358/1.15 |
| 2014/0198336 A1* | 7/2014 | Numata | G06K 15/4095 358/1.14 |
| 2015/0371126 A1* | 12/2015 | Ota | G06K 15/408 358/1.14 |

FOREIGN PATENT DOCUMENTS

| | | |
|---|---|---|
| JP | 2009271793 | 11/2009 |
| JP | 2012111170 | 6/2012 |

* cited by examiner

*Primary Examiner* — Mark R Milia
(74) *Attorney, Agent, or Firm* — JCIPRNET

(57) ABSTRACT

A printing control apparatus includes a processor configured to: transmit, when a print instruction is received from an operator, a printing processing command based on a print job to a printing apparatus; receive result information related to a result of an operation of the printing apparatus operating in accordance with the printing processing command from the operator; and transmit the result information to a process management apparatus.

20 Claims, 16 Drawing Sheets

FIG. 6

| JOB HISTORY | | | | | |
|---|---|---|---|---|---|
| RECORDING DATE AND TIME | ID | JOB NAME | RIP START DATE AND TIME | PRINT START DATE AND TIME | PRINT |
| //2021 :: |  | ***** | /**/2021 *:: | ::** | |
| //2021 :: |  | ******** | /**/2021 *:: | ::** | |
| //2021 :: |  | *********** | /**/2021 *:: | ::** | |
| //2021 :: |  | *** | /**/2021 *:: | ::** | */2021 |
| //2021 :: |  | *********** | //2021 :: | ::** | |
| //2021 :: |  | ***** | //2021 :: | //2021 ::** | */2021 |
| //2021 :: |  | **** | //2021 :: | //2021 ::** | |
| //2021 :: |  | *********** | //2021 :: | //2021 ::** | */2021 |
| //2021 :: |  | ***** | //2021 :: | //2021 ::** | |
| //2021 :: |  | *********** | //2021 :: | //2021 ::** | */2021 |

Popup menu (124):
- COMPLETION REPORT
- GROUP COMPLETION REPORT
- JOB DELETION

FIG. 10

| | COMPLETION REPORT | ☒ | ← 130 |
| --- | --- | --- | --- |

- 134-1 — WORK START DATE AND TIME: 01/07/2021 | 21:16 — 134-2
- 134-3 — WORK COMPLETION DATE AND TIME: 01/07/2021 | 21:37 — 134-4
- 134-5 — REQUIRED TIME (MIN): 21 [−] [+] — 138-1
- REASON FOR STOP: PAPER JAM ▽ — 136
- 134-6 — STOP TIME (MIN): 10 [−] [+] — 138-2
- 134-7 — NUMBER OF NON-DEFECTIVE PRODUCTS (COPIES): 100 [−] [+] — 138-3
- 134-8 — NUMBER OF DEFECTIVE PRODUCTS (COPIES): 2 [−] [+] — 138-4
- 134-9 — PRINT QUANTITY (SHEETS): 510 [−] [+] — 138-5
- 134-10 — NG QUANTITY (COPIES): 10 [−] [+] — 138-6

[CANCEL] [TRANSMIT] — 140

PRINTING CONTROL APPARATUS, NON-TRANSITORY COMPUTER READABLE MEDIUM STORING PROGRAM, AND PRINTING CONTROL METHOD

CROSS-REFERENCE TO RELATED APPLICATIONS

This application is based on and claims priority under 35 USC 119 from Japanese Patent Application No. 2021-175541 filed Oct. 27, 2021.

BACKGROUND

(i) Technical Field

The present invention relates to a printing control apparatus, a non-transitory computer readable medium storing a program, and a printing control method.

(ii) Related Art

In a printing company and the like, a digital printing machine (an electrophotographic printing apparatus, an ink jet printing apparatus, and the like) is used to manufacture a printed matter. A digital printing machine (hereinafter, referred to as a printing apparatus) is communicably coupled to a printing control apparatus called a digital front end (DFE) or a print server, and a printing system is composed of the printing control apparatus and the printing apparatus.

The printing control apparatus receives a print job including print setting information and document/image data to be printed from an upstream apparatus of a printed matter manufacturing process. The printing control apparatus operates in accordance with an operation of an operator, performs RIP processing or the like on the print job, and supplies a printing processing command including various parameters, raster images, and the like corresponding to the print job to the printing apparatus, thereby outputting a printed matter from the printing apparatus.

Further, in the printing company and the like, a process management apparatus for managing a manufacturing process of a printed matter is used. The operator operates the process management apparatus, and when printing processing of the print job is completed, inputs print result information (hereinafter, also simply referred to as result information) such as the time required for printing (required time), the number of copies of defective products generated, and the number of defective paper sheets generated for the print job.

By inputting such result information in association with identification information of the printing apparatus, the process management apparatus creates statistical information indicating, for example, processing efficiency, printing cost, and the number of troubles in each printing apparatus. Then, the process management apparatus provides the information to a manager or the like of the printing company. As a result, the manager or the like of the printing company can improve a printing process by, for example, actively allocating a print job to a printing apparatus (printing system) having high processing efficiency and few troubles.

JP2009-271793A discloses an apparatus coupled to a device that performs processing of each process indicated by a print job, in which in a case where it is determined that a predetermined process has been completed, the apparatus instructs the device that has performed the processing up to the process to delete data used for the processing of the print job, and then erases information about drawing data from the print job. The invention of JP2009-271793A relates to both security management and data reuse in a printing system.

In JP2012-111170A, a printing apparatus is disclosed in which in a case where reprinting is performed by using a history printing function of the printing apparatus after a printing work is completed, the printing apparatus associates a generated work with an original print job and notifies a system (management information system (MIS)) that performs a work man-hour management, and at the same time, notifies the MIS of the generated work man-hours as difference information of the man-hours of the original print job.

SUMMARY

The operator operates the printing control apparatus to cause the printing apparatus to perform printing processing based on the print job. On the other hand, when the printing processing is completed in the printing apparatus, the operator needs to operate the process management apparatus, which is an apparatus different from the printing control apparatus, and input print result information of the print job. The operation on such different apparatus is a burden on the operator.

Aspects of non-limiting embodiments of the present disclosure relate to a printing control apparatus, a non-transitory computer readable medium storing a program, and a printing control method enabling an operator to easily input print result information of a print job as compared with a case where an operator operates a process management apparatus to input print result information of a print job.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a printing control apparatus including a processor configured to: transmit, when a print instruction is received from an operator, a printing processing command based on a print job to a printing apparatus; receive result information related to a result of an operation of the printing apparatus operating in accordance with the printing processing command from the operator; and transmit the result information to a process management apparatus.

BRIEF DESCRIPTION OF THE DRAWINGS

Exemplary embodiment(s) of the present invention will be described in detail based on the following figures, wherein:

FIG. 6 is a diagram showing an example of a print job history screen;

FIG. 10 is a diagram showing an example of a completion report screen;

DETAILED DESCRIPTION

Figure 1:
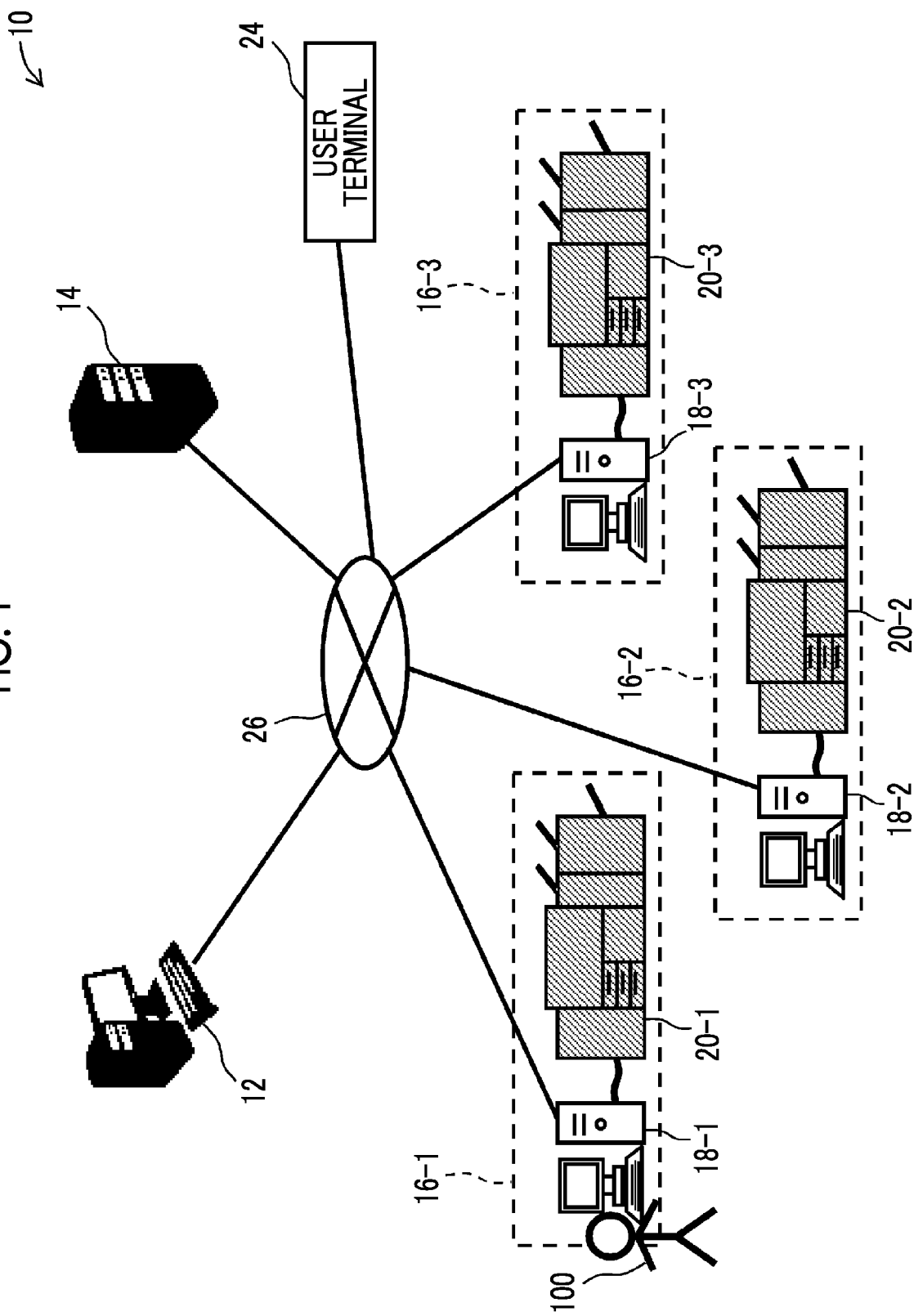
FIG. 1 is a schematic configuration diagram of a printed matter manufacturing system.

Hereinafter, each exemplary embodiment will be described in detail with reference to the accompanying drawings. The configuration described below is an example for description, and can be appropriately changed according to specifications of a system and an apparatus. Further, in a case where a plurality of exemplary embodiments, modifications, and the like are included in the following, it is assumed from the beginning that the characteristic portions are appropriately combined and used. The identical elements are designated by the identical reference numerals in all drawings, and duplicate description is omitted.

FIG. 1 is a schematic configuration diagram of a printed matter manufacturing system 10. The manufacturing system 10 is used by a printing company or the like that is engaged in a printed matter manufacturing business. The printed matter includes various documents, booklets, pamphlets, catalogs, leaflets, magazines, books, and the like. In this exemplary embodiment, the printed matter refers to a printed matter produced by forming an image on paper, in particular by a digital printing machine.

The manufacturing system 10 includes an order receiving system 12, a process management apparatus 14, a plurality of printing systems 16-1, 16-2, and 16-3, and a user terminal 24, which are communicably coupled to each other via a network 26. The number of each system and each apparatus shown in FIG. 1 is an example, and can be changed as appropriate. Hereinafter, in a case where it is not necessary to distinguish each printing system 16-1, 16-2, and 16-3, it is referred to as a printing system 16. The network 26 is, for example, a LAN, an intranet, the Internet, or the like.

The order receiving system 12 is a computer that manages information on a manufacturing request for a printed matter ordered by a customer. The process management apparatus 14 is a computer that manages the progress of manufacturing of the printed matter, and is also called a workflow management apparatus.

The printing system 16-1 includes a printing control apparatus 18-1 and a printing apparatus 20-1. The printing systems 16-2 and 16-3 have the same configuration as the printing system 16-1. Hereinafter, in a case where it is not necessary to distinguish the printing control apparatuses 18-1, 18-2, and 18-3, it is referred to as a printing control apparatus 18, and in a case where it is not necessary to distinguish the printing apparatuses 20-1, 20-2, and 20-3, it is referred to as a printing apparatus 20.

The printing apparatus 20 is an apparatus that forms an image on a medium such as paper, and is also called an image forming apparatus. The printing apparatus 20 is a digital printing machine such as an electrophotographic printing apparatus and an ink jet printing apparatus, and is, for example, a production printer capable of printing at high speed and with high accuracy. A part or all of the plurality of printing apparatuses 20 may have a cover insertion function and a post-processing function (punching (hole punching) processing, staple processing, saddle stitching processing, folding processing, cutting processing, and the like). According to such a printing apparatus 20, it is possible to output a printed matter such as a booklet by performing post-processing after printing on paper. Note that some or all of the plurality of printing apparatuses 20 may have only a printing function.

The printing control apparatus 18 is a computer called a digital front end (DFE) or a print server. The printing control apparatus 18 is communicably coupled to the printing apparatus 20. The printing control apparatus 18 manages a print job, performs various processing and settings for the print job according to an operation from an operator 100, and performs RIP processing on image data of the print job to generate a raster image. Further, the printing control apparatus 18 outputs a printed matter from the printing apparatus 20 by supplying a printing processing command including various parameters, raster images, and the like corresponding to the print job to the printing apparatus 20 according to a print instruction from the operator 100. The printing control apparatus 18 also functions as an apparatus for managing a state of the printing apparatus 20 and making various settings.

The user terminal 24 is, for example, a personal computer (PC), a tablet, a smartphone, or the like. The manufacturing system 10 is configured so that the user (hereinafter, also referred to as an operator) can remotely operate the order receiving system 12 and the process management apparatus 14 by using the user terminal 24 and display information existing in the order receiving system 12 and the process management apparatus 14 on a display of the user terminal 24. The user terminal 24 is used by an operator, a manager, or the like who is in charge of order management, process management, and the like.

Here, a manufacturing process of a printed matter will be briefly described. The printed matter manufacturing process consists of, for example, a submission process, a prepress process, a printing process, a post-processing process, and a delivery process. The submission process is a process of receiving a manufacturing request for a printed matter from a customer. In the submission process, the order receiving system 12 receives specifications of the printed matter, document/image data to be printed, the number of copies to be manufactured, a delivery destination, and the like from a customer's terminal (PC or the like, not shown) coupled to the network 26, and manages as manufacturing request information 38 (see FIG. 2).

The prepress process is a process of preparing to perform printing processing on the printing apparatus 20. In the prepress process, the manufacturing request information 38 in the order receiving system 12 is read out, and one or more print jobs are generated based on the manufacturing request information 38. The print job is a processing unit in the printing system 16, and includes print setting information and image data to be printed. The print setting information is, for example, the number of copies to be printed, the number of sheets per copy, the type of paper, the presence/absence of two-sided printing, the setting of color/monochrome, and the like. The image data of the print job is, for example, portable document format (PDF) format data.

Each print job is transmitted to one of a plurality of printing control apparatuses 18-1, 18-2, and 18-3, and is managed in the printing control apparatus 18. The printing control apparatus 18 performs various processing and settings for the print job according to the operation from the operator 100, and performs RIP processing on the image data of the print job to generate a raster image.

The printing process is a process of performing printing processing on the printing apparatus 20. In the printing process, the operator 100 operates the printing control apparatus 18, designates a print job, and gives a print instruction. As a result, a printing processing command (including various parameters and raster images) corresponding to the designated print job is supplied to the printing apparatus 20, and the printed matter is output from the printing apparatus 20. The operator 100 confirms troubles such as paper jam that occurs in the printing apparatus 20 and events such as paper replenishment and toner replacement required by the printing apparatus 20 during the printing processing in the printing apparatus 20, by using the printing control apparatus 18, and takes measures.

After the printed matter is output from the printing apparatus 20, the operator 100 operates the printing control apparatus 18, inputs a completion report (details will be described later), and transmits the completion report to the process management apparatus 14. The work of the printing process refers to a process from the print instruction with respect to the printing apparatus 20 by the operator 100 to the transmission of the completion report with respect to the process management apparatus 14.

In a case where the print job includes a command related to post-processing (command such as punching processing, staple processing, saddle stitching processing, folding processing, cutting processing, and the like), the printing apparatus 20 performs post-processing after the printing processing on the paper and outputs a printed matter.

The post-processing process is a process of performing punching processing, staple processing, saddle stitching processing, folding processing, cutting processing, book-binding processing, or the like on the paper or the like output from the printing apparatus 20 by using a processing apparatus (not shown). The post-processing process is a process performed as needed.

The delivery process is a work of delivering the manufactured printed matter to the delivery destination contacted by the customer.

The above is a series of printed matter manufacturing processes. The operator in charge of each process notifies the process management apparatus 14 of the manufacturing status of each printed matter by using a computer coupled to the network 26. The process management apparatus 14 creates and manages manufacturing progress information 50 (see FIG. 2) of each printed matter based on the manufacturing status notified by each operator. The progress information 50 is confirmed by the manager or the like of the printing company by using the user terminal 24 or the like.

Figure 2:
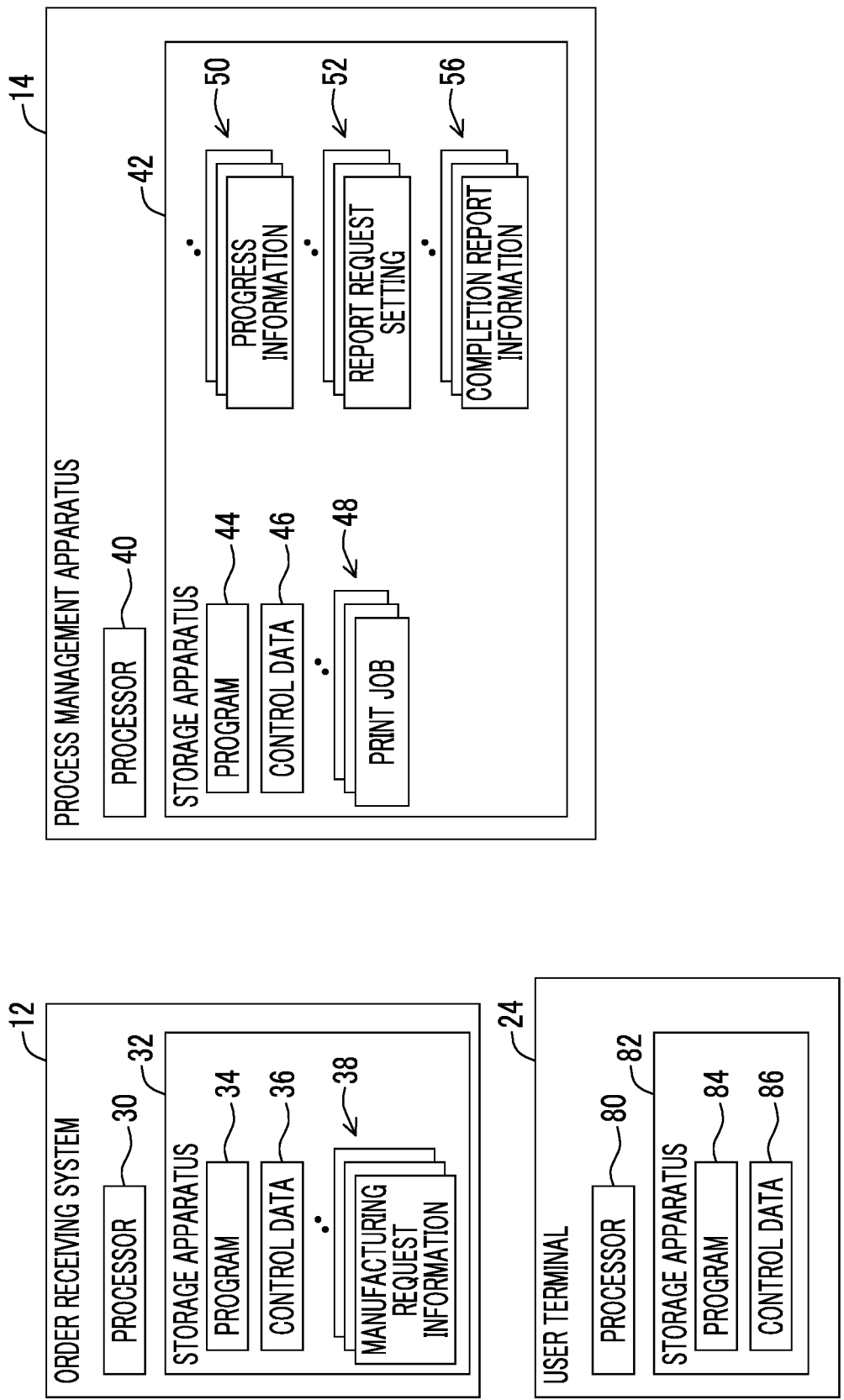
FIG. 2 is a functional block diagram of an order receiving system, a process management apparatus, and a user terminal.
Figure 3:
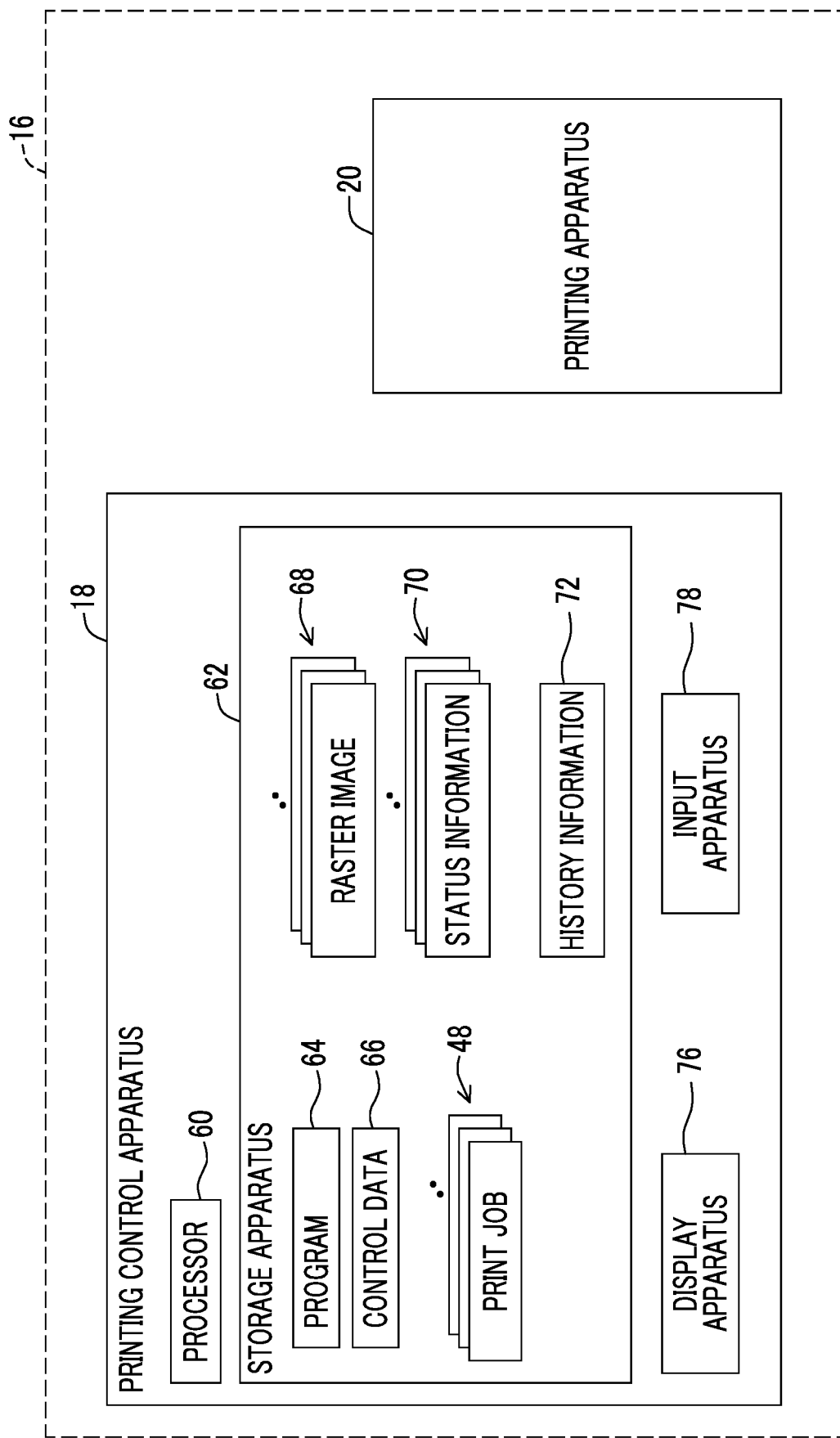
FIG. 3 is a functional block diagram of a printing system.

Next, configurations of each system and each apparatus will be described. FIG. 2 is a functional block diagram of the order receiving system 12, the process management apparatus 14, and the user terminal 24. The order receiving system 12 includes a processor 30 and a storage apparatus 32. The processor 30 includes a CPU and executes information processing according to a program 34 and control data 36 installed in the order receiving system 12. The processor 30 can be defined as a computer in a narrow sense. The storage apparatus 32 is a ROM, RAM, flash memory, hard disk, or the like. The storage apparatus 32 stores the program 34, the control data 36, and the manufacturing request information 38.

The process management apparatus 14 includes a processor 40 and a storage apparatus 42. The processor 40 includes a CPU and executes information processing according to a program 44 and control data 46 installed in the process management apparatus 14. The processor 40 can be defined as a computer in a narrow sense. The storage apparatus 42 is a ROM, RAM, flash memory, hard disk, or the like. The storage apparatus 42 stores the program 44, the control data 46, a print job 48, the progress information 50, report request setting 52, and completion report information 56.

The user terminal 24 includes a processor 80 and a storage apparatus 82. The processor 80 includes a CPU and executes information processing according to a program 84 and control data 86 installed in the user terminal 24. The processor 80 can be defined as a computer in a narrow sense. The storage apparatus 82 is a ROM, RAM, flash memory, hard disk, or the like. The program 84 and the control data 86 are stored in the storage apparatus 82.

The printing system 16 includes the printing control apparatus 18 and the printing apparatus 20. The printing control apparatus 18 includes a processor 60, a storage apparatus 62, a display apparatus 76, and an input apparatus 78. The processor 60 includes a CPU and executes information processing according to a program 64 and control data 66 installed in the printing control apparatus 18. The processor 60 can be defined as a computer in a narrow sense. The storage apparatus 62 is a ROM, RAM, flash memory, hard disk, or the like. The storage apparatus 62 stores the program 64, the control data 66, the print job 48, a raster image 68, status information 70 (information indicating a state of each print job 48), and history information 72. The display apparatus 76 is a display. The input apparatus 78 is a keyboard, a mouse, or the like.

The programs executed by the processors of each system and each apparatus, and the control data to be read can be provided not only via a network such as the Internet, but also provided by storing in a computer-readable recording medium such as an optical disk and a USB memory.

The process management apparatus 14 stores a plurality of print jobs 48, and the printing system 16 is assigned to each of the plurality of print jobs 48 in accordance with an operator's instruction or the like. The print job 48 is transmitted from the process management apparatus 14 to the printing control apparatus 18 of the assigned printing system 16, and is managed in the printing control apparatus 18.

Figure 4:
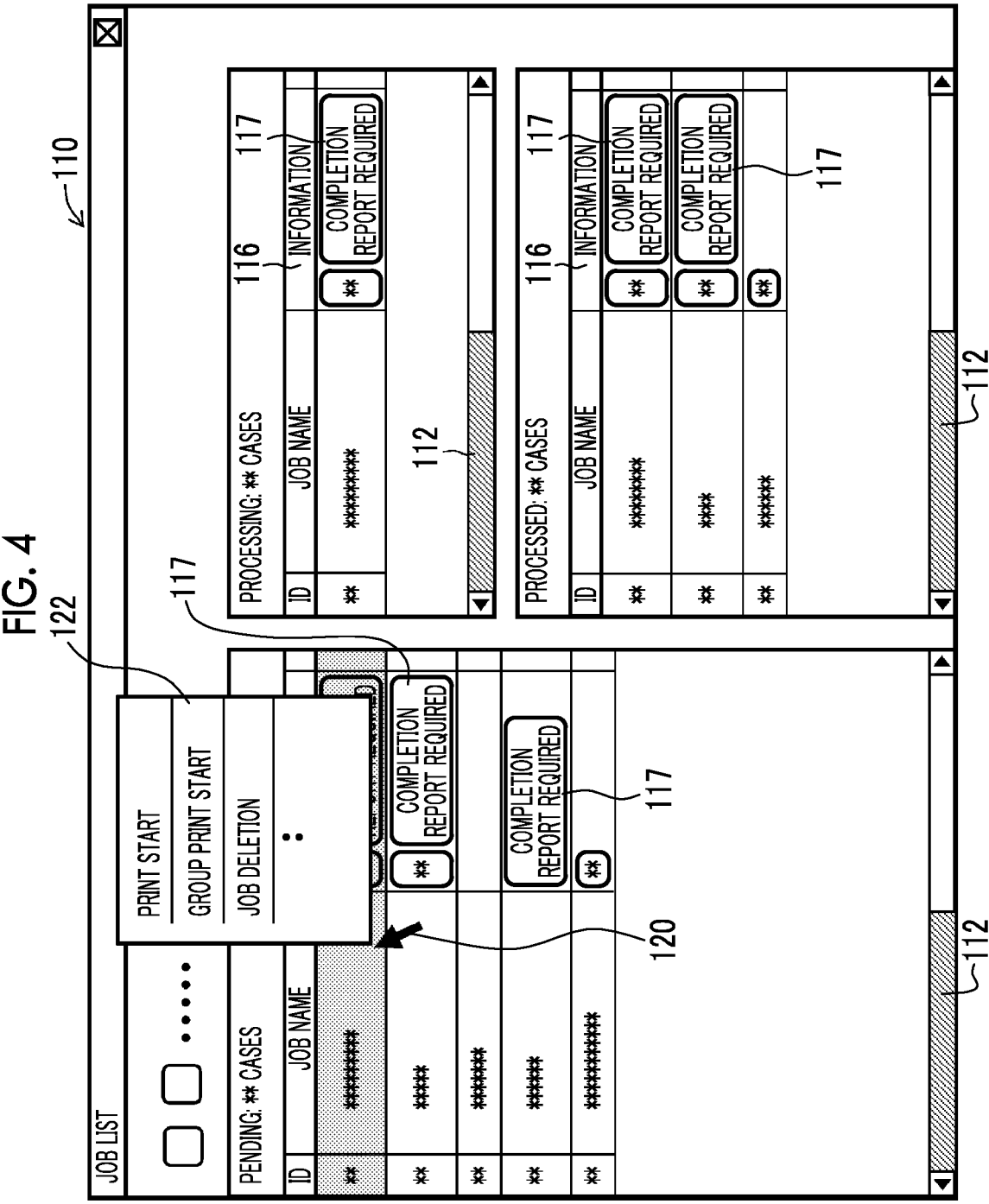
FIG. 4 is a diagram showing an example of a print job list screen.
Figure 5:
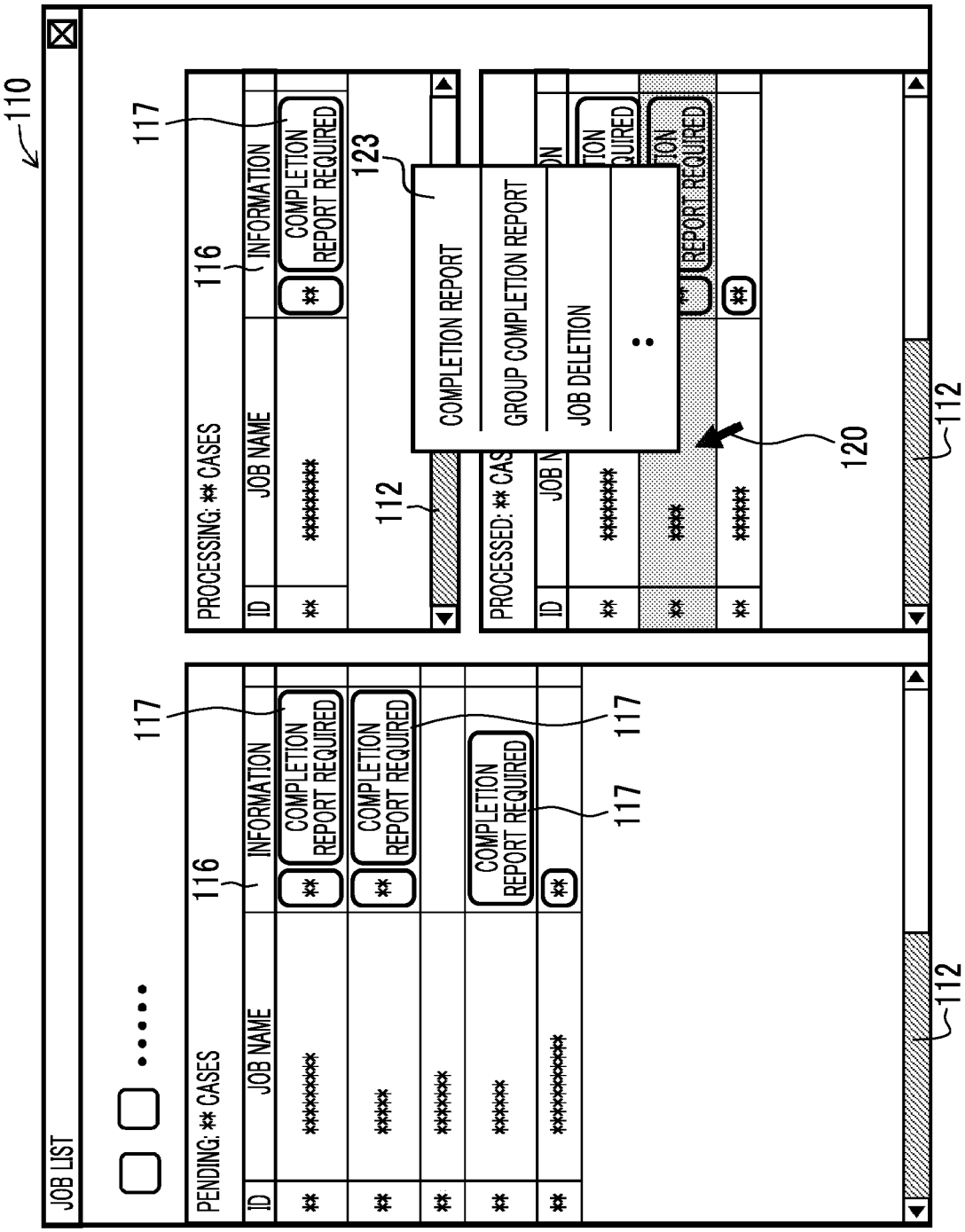
FIG. 5 is a diagram showing an example of a print job list screen.

FIGS. 4 and 5 are examples of a print job list screen 110 displayed on the display apparatus 76 of the printing control apparatus 18, and FIG. 6 is an example of a print job history screen 111 displayed on the display apparatus 76 of the printing control apparatus 18. In the present specification, in addition to a display object displayed on the entire display, a window displayed on a portion of the display may also be referred to as a screen.

As shown in FIGS. 4 and 5, on the list screen 110, information of each print job stored in the printing control apparatus 18 is divided and displayed in accordance with a state of a print job (pending, processing, processed). In FIGS. 4 and 5, by operating a scroll bar 112, a lot of pieces of information of the print job can be confirmed. In an item 116 of "information" of the print job, the state of the print job (for example, whether or not RIP processing is completed) and setting information are displayed in an easy-to-understand manner with marks, and one of the marks is a mark 117 of "completion report required". The mark 117 of "completion report required" indicates whether or not the print job requires a completion report of the printing work, a print job with the mark 117 indicates that a completion report is required, and a print job without the mark 117 indicates that a completion report is not required.

The completion report of the printing work (see FIG. 10) is a work performed when the printing processing of the print job is completed in the printing apparatus 20. The completion report is a work in which the operator 100 inputs the result information (also referred to as print result information) related to the result of the operation of the printing apparatus 20 in accordance with the print job to the printing control apparatus 18 and transmits the result information to the process management apparatus 14.

Figure 7:
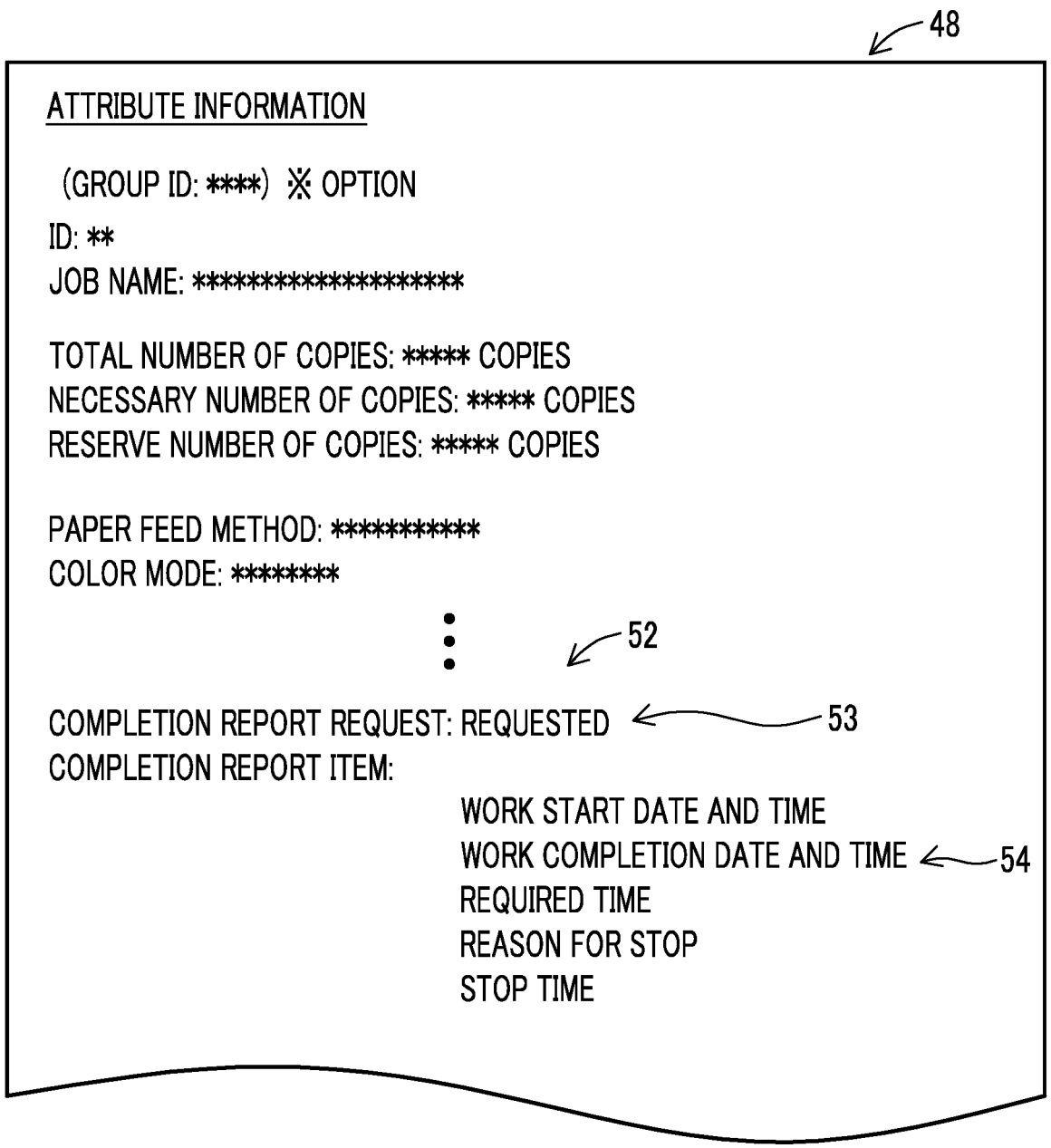
FIG. 7 is a diagram for describing attribute information of a print job.

FIG. 7 shows an example of attribute information included in the print job 48. Such attribute information is described in a predetermined format and language, but in the figure, it is drawn in a form in which information is enumerated in order to promote understanding. The attribute information of the print job includes the report request setting 52. The report request setting 52 includes a completion report request presence/absence information 53 and a completion report item 54 (also referred to as a result information item).

The request presence/absence information 53 is information indicating whether or not a completion report is required. The print job for which the request presence/absence information 53 is specified as "requested" is marked with the "completion report required" mark 117 in FIGS. 4 and 5, and the print job for which the request presence/absence information 53 is specified as "not requested" is not marked with the "completion report required" mark 117 in FIGS. 4 and 5. The completion report item 54 indicates an item for which the completion report is requested to be input by the operator 100. Each item specified in the completion report item 54 is displayed on the completion report screen 130 (see FIG. 10), and information corresponding to each item is input from the operator 100.

The report request setting 52 is added to the print job 48 by the operator's operation or automatically in the process management apparatus 14. For example, the completion report request presence/absence information 53 and the completion report item 54 may be set according to the attributes of the printed matter. For example, in a case where the print job 48 is a "test print" job for confirming the color or the like of the printed matter, it is set that the completion report is not required, and in a case where the print job 48 is a "main print" job, it is set that the completion report is required. Further, for example, in a case of a print job for which the number of prints is equal to or less than a predetermined number of prints, it may be set that the completion report is not required, and in a case of a print job for which the number of prints is more than a predetermined number of prints, it may be set that the completion report is required. Further, for example, in a case of the print job for which the number of prints is equal to or less than a predetermined number of prints, the input of the time required for printing (required time) may not be requested (the completion report item does not include the "required time"), and in a case of the print job for which the number of prints is more than a predetermined number of prints, the input of the required time may be requested (the completion report item includes the "required time"). Further, for example, in a case of a print job related to a printed matter manufactured via a post-processing process (a printed matter obtained by processing a print result output from the printing apparatus 20 in a post-processing process), it may be set that a completion report is required, and in a case of a print job for which the print result output from the printing apparatus 20 is a final product, it may be set that a completion report is not required.

As shown in FIG. 4, a menu 122 including items such as "print start", "group print start", and "job deletion" is displayed by the operator 100 operating a mouse to move a cursor 120 to one of the print jobs in a pending state, and right-clicking there. The instruction indicated in the item on which the cursor 120 is located can be given by the operator 100 moving the cursor 120 to a desired item in the menu 122, and left-clicking there. Similarly, as shown in FIG. 5, a menu 123 including items such as "completion report", "group completion report", and "job deletion" is displayed by the operator 100 operating the mouse to move the cursor 120 to one of the print jobs in a processed state, and right-clicking there. The instruction indicated in the item on which the cursor 120 is located can be given by the operator 100 moving the cursor 120 to a desired item in the menu 123, and left-clicking there.

As shown in FIG. 6, in the history screen 111, the history information 72 stored in the printing control apparatus 18 is arranged and displayed in chronological order of the recording date and time. The history information 72 is information in which a print job is recorded, when an event for the print job occurs, for each print job. In FIG. 6, by operating a scroll bar 113 that moves horizontally, a lot of pieces of information of the print job can be confirmed, and by operating a scroll bar 114 that moves vertically, information that is old or new in recording date and time can be confirmed.

As shown in FIG. 6, a menu 124 including items such as "completion report", "group completion report", and "job deletion" is displayed by the operator 100 operating the mouse to move the cursor 120 to one of the print jobs, and right-clicking there. The instruction indicated in the item on which the cursor 120 is located can be given by the operator 100 moving the cursor 120 to a desired item in the menu 124, and left-clicking there.

Figure 8:
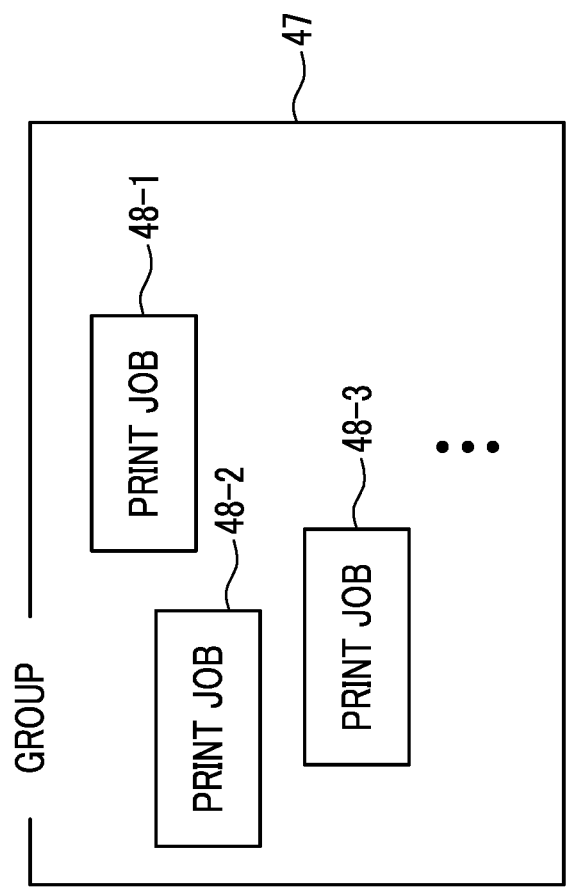
FIG. 8 is a diagram for describing a group job.

Here, a group job will be described. As shown in FIG. 8, the process management apparatus 14 may group a plurality of print jobs 48-1, 48-2, 48-3, . . . , and manage the print jobs as a group job 47. A group ID (see FIG. 7) is added as attribute information to the print jobs 48-1, 48-2, 48-3, . . . which are the group job 47, and one group job is composed of a plurality of print jobs having the identical group ID. For example, when a manufacturing request for a plurality of printed matters is received, a plurality of print jobs will be created, but in a case where these print jobs are set to use the same type of paper, these print jobs are grouped into a group job. Then, the printing processing of the plurality of print jobs constituting the group job is performed collectively. As a result, it is possible to reduce the work of replacing the paper to be fed to the printing apparatus 20. In a case of the printing apparatus 20 of the printing factory, since a large amount of paper is able to be stored, it takes time and labor to replace the paper, but such a group job may reduce the burden.

As shown in FIG. 4, in a case where the print job designated by the cursor 120 is one print job constituting the group job, the item "start group print" is displayed in the menu 122, and when the item is selected, the printing processing of all the print jobs belonging to the identical group as the designated print job is performed collectively.

As shown in FIG. 5 (or FIG. 6), in a case where the print job designated by the cursor 120 is one print job constituting the group job, the item "group completion report" is displayed in the menu 123 (or 124), and when the item is selected, the completion report of all the print jobs belonging to the identical group as the designated print job is performed collectively.

Figure 9:
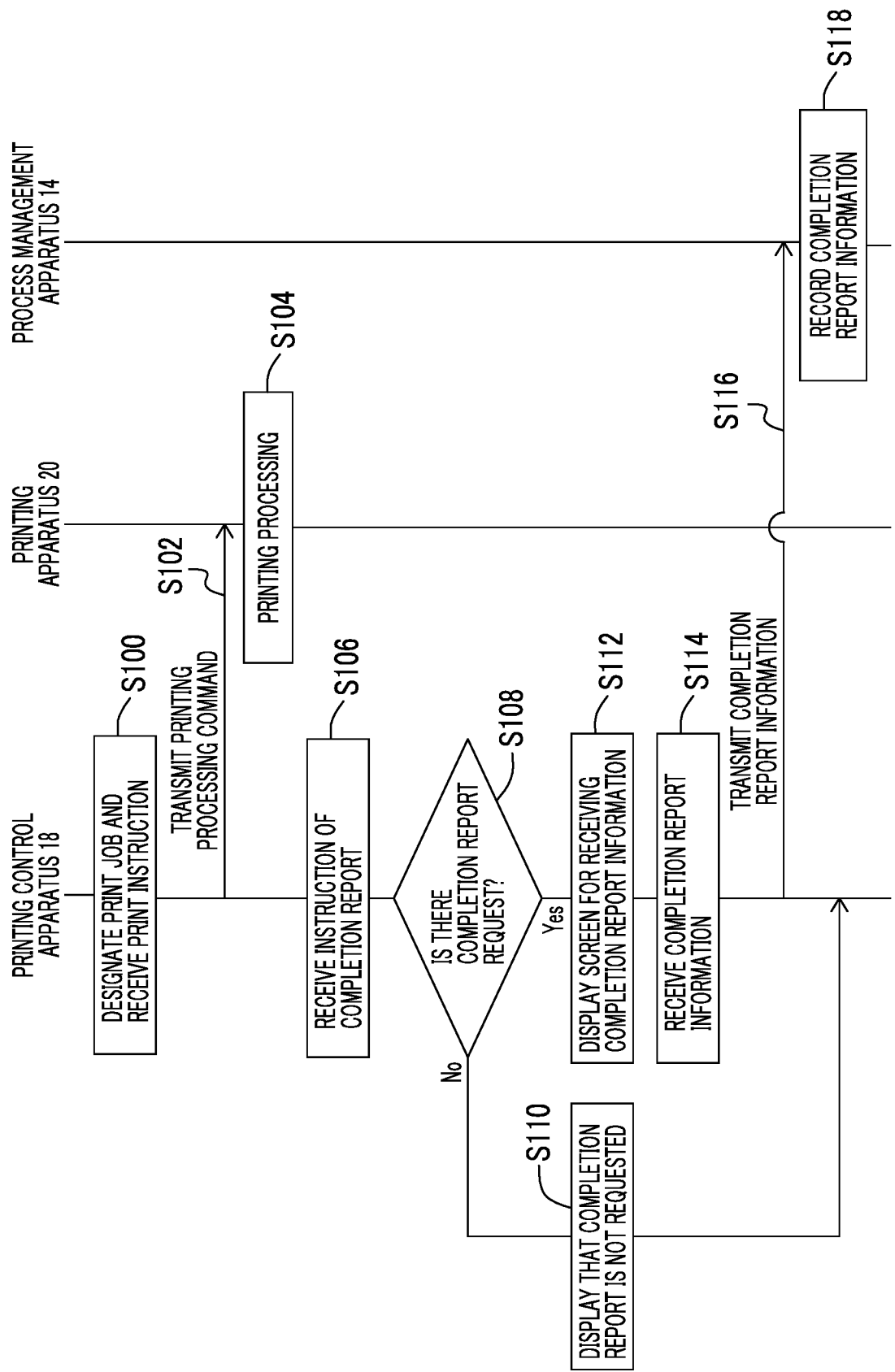
FIG. 9 is a flowchart showing a work flow of a printing process.

Next, a work of a printing process of a single print job (a print job that does not constitute a group job) will be described. FIG. 9 is a flowchart showing a work flow of the printing process. In S100, the operator 100 operates the printing control apparatus 18, designates a print job with the cursor 120, and selects "print start" in the menu 122, as shown in FIG. 4. As a result, the printing control apparatus 18 receives the designation of the print job and the print instruction of the print job.

In S102, the printing control apparatus 18 transmits a printing processing command including various parameters and raster images corresponding to the designated print job to the printing apparatus 20. In S104, the printing apparatus 20 receives the printing processing command and executes the printing processing according to the printing processing command. As a result, a printed matter is output from the printing apparatus 20. The operator 100 takes measures when troubles such as paper jam occur in the printing apparatus 20 during the printing processing, or when paper replenishment, toner replacement, or the like is required. Further, the operator 100 confirms the printed matter output from the printing apparatus 20 and determines whether the printed matter is non-defective or defective. Then, for example, in a case where the required number of non-defective products is not obtained, the operator 100 adjusts the number of copies to be manufactured in the printing control apparatus 18 and gives a print instruction for the print job again so that the required printed matter can be obtained.

In S106, the operator 100 operates the printing control apparatus 18, designates a print job with the cursor 120 as shown in FIG. 5 (or FIG. 6), and selects "completion report" in the menu 123 (or 124). As a result, the printing control apparatus 18 receives the designation of the print job and the instruction of the completion report.

Figure 11:
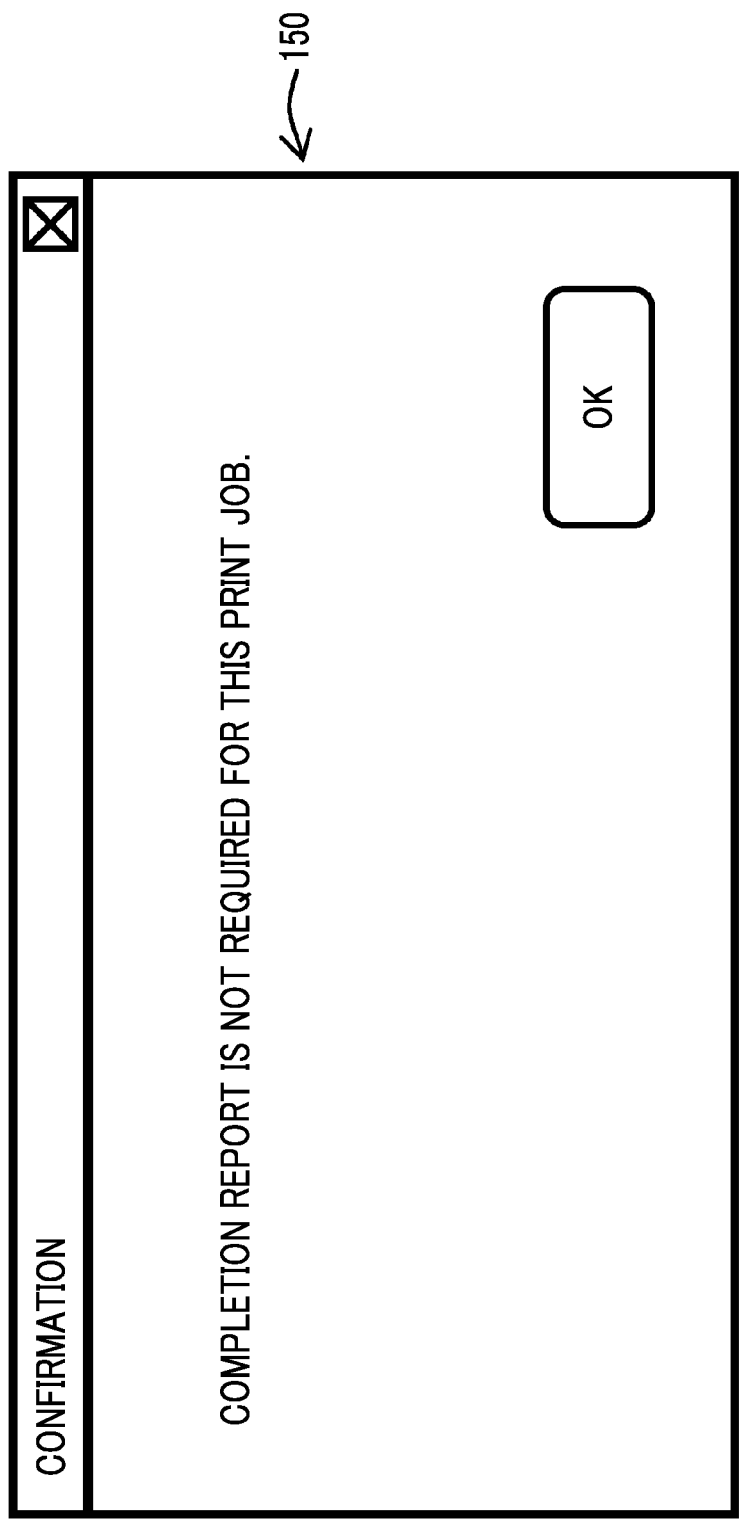
FIG. 11 is a diagram showing an example of a confirmation screen for completion report not required.

In S108, the printing control apparatus 18 confirms the completion report request presence/absence information 53 in the attribute information of the print job designated in S106. In a case where the request presence/absence information 53 indicates "not requested" (S108: No) in S110, the printing control apparatus 18 performs control of the display apparatus 76 of the printing control apparatus 18 to display a confirmation screen 150 indicating that a completion report is unnecessary as shown in FIG. 11. In a case where the request presence/absence information 53 indicates "not requested", the selection items related to the completion report of the menu 123 of FIG. 5 or the menu 124 of FIG. 6 may not be selected (for example, the selection items related to the completion report may be disabled (grayed out) so that the selection items cannot be selected). On the other hand, in a case where the request presence/absence information 53 indicates "requested" (S108: Yes) in S112, the printing control apparatus 18 performs control of the display apparatus 76 of the printing control apparatus 18 to display the completion report screen 130 (screen for receiving the result information) as shown in FIG. 10.

On the completion report screen 130, the completion report item 54 (result information item) in the attribute information of the print job designated in S106 is displayed. On the completion report screen 130 of FIG. 10, "work start date and time", "work completion date and time", "required time", "reason for stop", "stop time", "number of non-defective products", "number of defective products", "print quantity" and "NG quantity" are displayed as the items. The completion report screen 130 is provided with text boxes 134-1 to 134-10 for receiving information corresponding to each item from the operator 100. In addition, "+" and "−" buttons 138-1 to 138-6 are provided beside some text boxes so that numerical values in the text boxes can be increased or decreased. Further, the item of "reason for stop" is selected from a pull-down menu 136. The configuration for receiving the information of each item shown in FIG. 10 is an example, and the configuration can be changed as appropriate.

The "work start date and time" is the date and time when the operator 100 gives a print instruction, and the printing control apparatus 18 may automatically set the date and time instead of the input from the operator 100. The "work completion date and time" is the date and time when the completion report by the operator 100 ends. The "required time" is the time from the work start date and time to the work completion date and time, and may be automatically set by the printing control apparatus 18 instead of the input from the operator 100. The "required time" includes, in addition to the printing processing time of the printing apparatus 20, the time required for the operator 100 to deal with a failure such as a paper jam, the time required for paper replacement, paper replenishment, toner replacement, and the like, the time required for confirming the output printed matter, and the like. The "reason for stop" is a reason for stopping when the printing apparatus 20 is stopped. The "stop time" is the stop time when the printing apparatus 20 is stopped. The "number of non-defective products" is the number of copies of the printed matter output from the printing apparatus 20 that is determined by the operator 100 to be non-defective. One printed matter is composed of one or more sheets of paper. The "number of defective products" is the number of copies of the printed matter output from the printing apparatus 20 that is determined by the operator 100 to be defective. The "print quantity" is the number of sheets output from the printing apparatus 20. The "NG quantity" is the number of sheets consumed without forming a printed product (printed matter determined to be a non-defective product).

In S114 of FIG. 9, the operator 100 operates the printing control apparatus 18 (by using the input apparatus 78 of the printing control apparatus 18) to input information corresponding to each item of the completion report screen 130. That is, the information is input to the text boxes 134-1 to 134-10, and the information is selected from the pull-down menu 136. Then, the operator 100 instructs transmission by moving the mouse cursor to a "transmission" button 140 on the completion report screen 130 and left-clicking. As a result, the printing control apparatus 18 receives the information related to the completion report input from the operator 100 (hereinafter, referred to as completion report information (result information and print result information)).

In S116, the printing control apparatus 18 adds identification information of the printing apparatus 20 or the printing system 16 to the completion report information, and transmits the information to the process management apparatus 14. Then, in S118, the process management apparatus 14 receives the completion report information and stores the completion report information in the storage apparatus 42 of the printing control apparatus 18.

By accumulating the completion report information 56 (see FIG. 2), the process management apparatus 14 creates statistical information indicating the processing efficiency, the printing cost, the number of troubles, and the like of each printing apparatus 20, and provides the information to the manager of the printing company or the like. As a result, the manager or the like of the printing company may obtain information for improving the printing process.

According to the exemplary embodiment described above, since the operator 100 is able to operate the printing control apparatus 18 used for the work of the prepress process and the printing process to perform the completion report of the print job (input of the print result information), the burden on the operator 100 is reduced as compared with the case where the process management apparatus 14, which is an apparatus different from the printing control apparatus 18, is operated to perform the completion report.

Further, according to the exemplary embodiment described above, it is possible to flexibly set whether or not to request the completion report and the completion report items for each print job 48. When the operator 100 operates the printing control apparatus 18 to change the print setting information of the print job that may affect the operation of the printing apparatus 20, the printing control apparatus 18 may forcibly change the request presence/absence information of the print job to "requested". As a result, the completion report is always performed for the print job for which print setting information has been changed.

Figure 12:
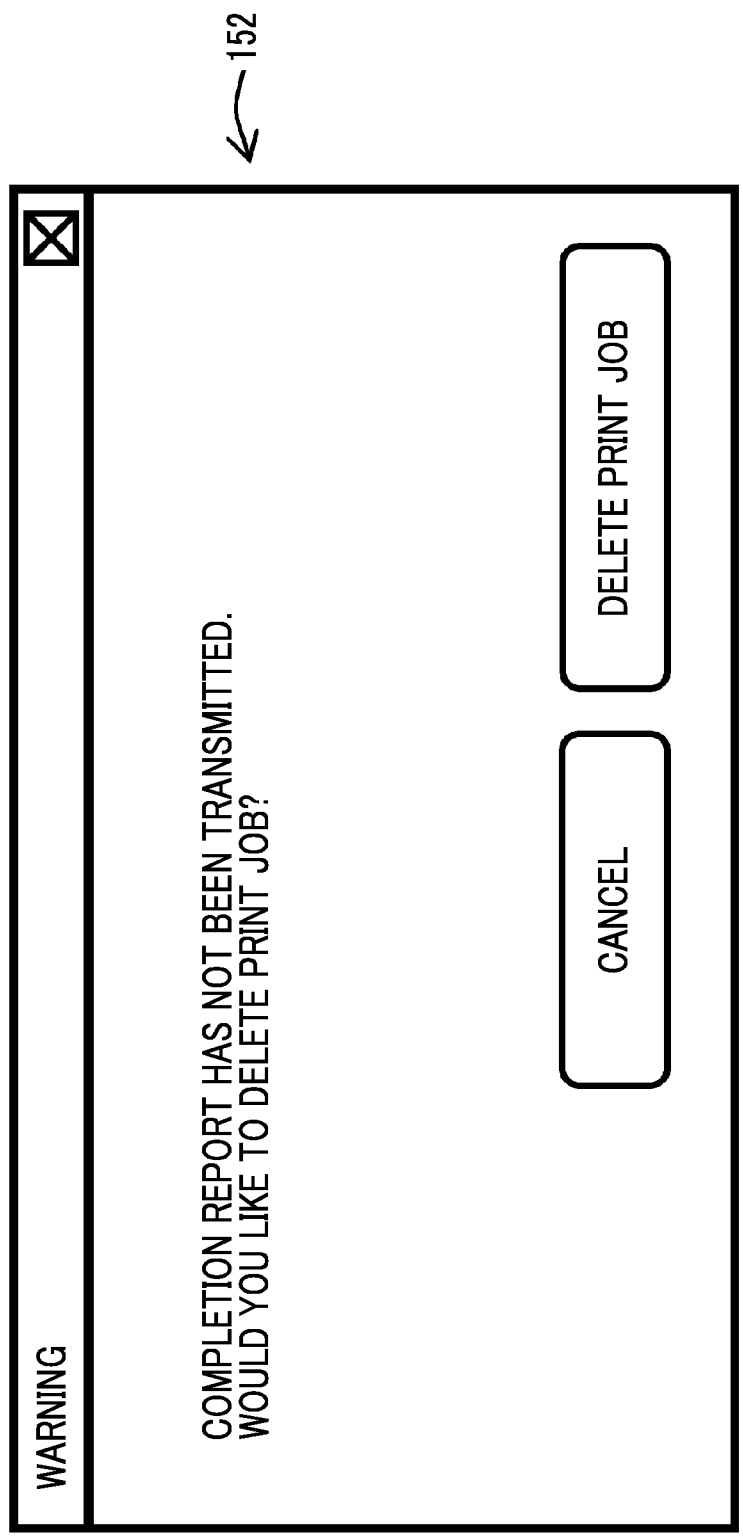
FIG. 12 is a diagram showing an example of a warning screen related to deletion of a print job.

When the instruction to delete (erase) the print job is received in a state where the operator 100 has not reported the completion of the print job for which the request presence/absence information 53 is "requested", the printing control apparatus 18 may perform control of the display apparatus 76 of the printing control apparatus 18 to display a warning screen 152 indicating that the completion report has not been transmitted (result information has not been input), as shown in FIG. 12. In this manner, it is suppressed that the completion report is not transmitted from the operator 100.

Figure 13:
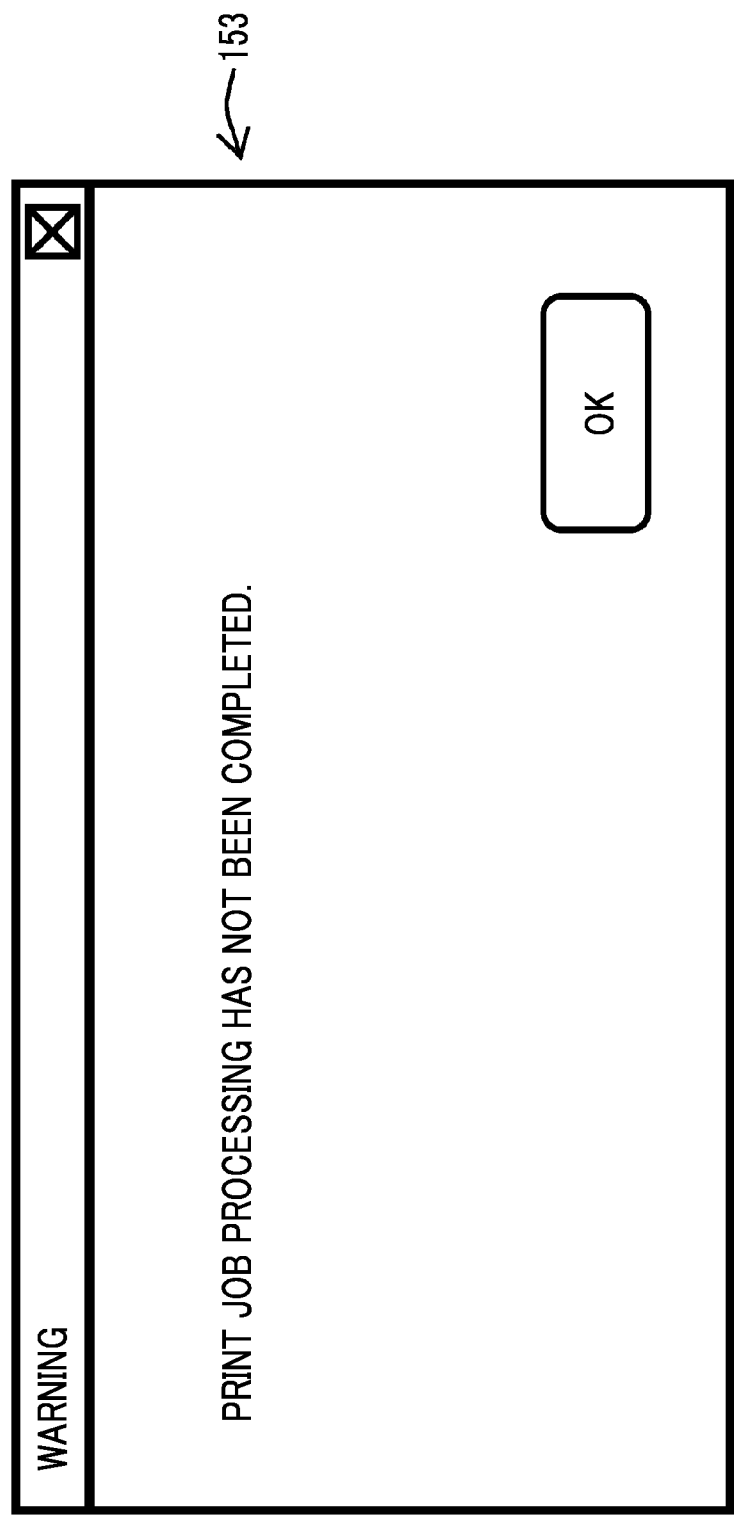
FIG. 13 is a diagram showing an example of a warning screen related to incomplete processing of a print job.

Further, when the operator gives an instruction (request for input of result information) of "completion report" in the menu 124 of the history screen 111 (see FIG. 6), for example, in a state where the printing processing of the print job is not completed for the print job for which the request presence/absence information 53 is "requested", the printing control apparatus 18 may perform control of the display apparatus 76 of the printing control apparatus 18 to display a warning screen 153 indicating that the printing processing has not been completed, as shown in FIG. 13. In this manner, it is suppressed that the operator inputs incorrect result information.

Figure 14:
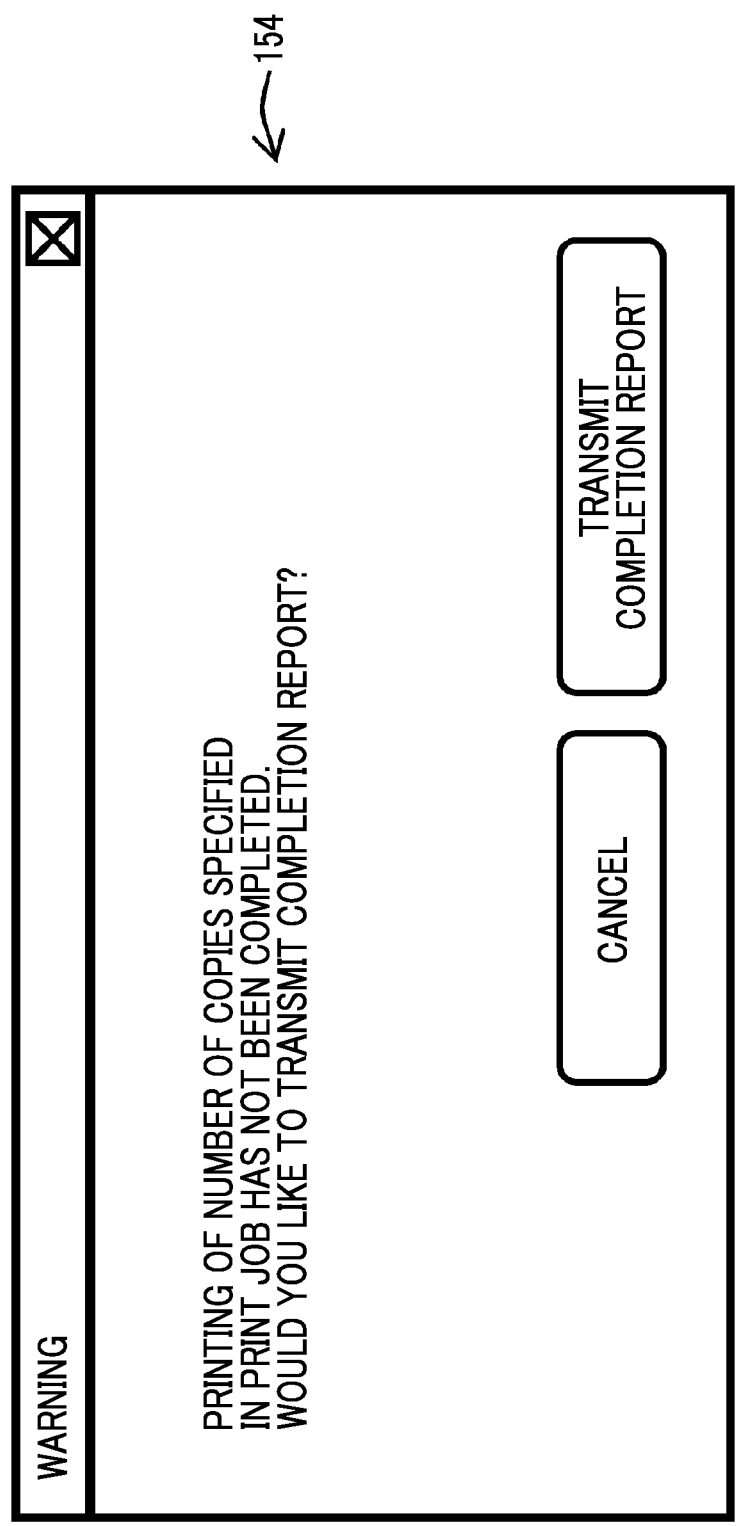
FIG. 14 is a diagram showing an example of a warning screen indicating that a specified number of copies of a print job has not been reached.

As shown in FIG. 7, a "total number of copies" as the number of copies of the printed matter to be manufactured is specified in the print job 48. Further, in the print job 48, a "necessary number of copies" and a "reserve number of copies" are further specified. The sum of the "necessary number of copies" and the "reserve number of copies" is the "total number of copies". Here, when a quantity less than the "total number of copies" of the print job is input to the "number of non-defective products" (see FIG. 10) of the completion report screen 130 shown in FIG. 10 and the "transmission" button 140 is pressed, the printing control apparatus 18 may perform control of the display apparatus 76 of the printing control apparatus 18 to display a warning screen 154 indicating that the printing processing of the number of copies specified for the print job has not been completed, as shown in FIG. 14. Alternatively, when a quantity less than the "necessary number of copies" of the print job is input to the "number of non-defective products" (see FIG. 10) on the completion report screen 130 shown in FIG. 10 and the "transmission" button 140 is pressed, the printing control apparatus 18 may perform control to display the warning screen 154 as shown in FIG. 14. In this manner, it is suppressed that the operator inputs incorrect result information.

In the exemplary embodiment described above, although the report request setting 52 (completion report request presence/absence information 53 and completion report item 54) is added to the print job, the completion report may be uniformly requested for all the print jobs without adding the report request setting 52 to the print job, or input for a predetermined completion report item may be required for all the print jobs.

As for the group job 47, as described above, the printing processing of all the print jobs belonging to the identical group is collectively performed, and the completion report of all the print jobs belonging to the identical group is collectively performed. On the completion report screen 130 (see FIG. 10), the printing processing of all the print jobs belonging to the identical group is regarded as the printing processing of one print job, and the print result information is input. That is, for the "number of non-defective products", the quantity obtained by adding the number of non-defective products of all the print jobs in the group is input, and for the "number of defective products", the quantity obtained by adding the number of defective products of all the print jobs in the group is input. The same applies to the "print quantity" and "NG quantity" of the completion report screen 130. It is assumed that the identical report request setting 52 is specified for all the print jobs belonging to the identical group.

Figure 15:
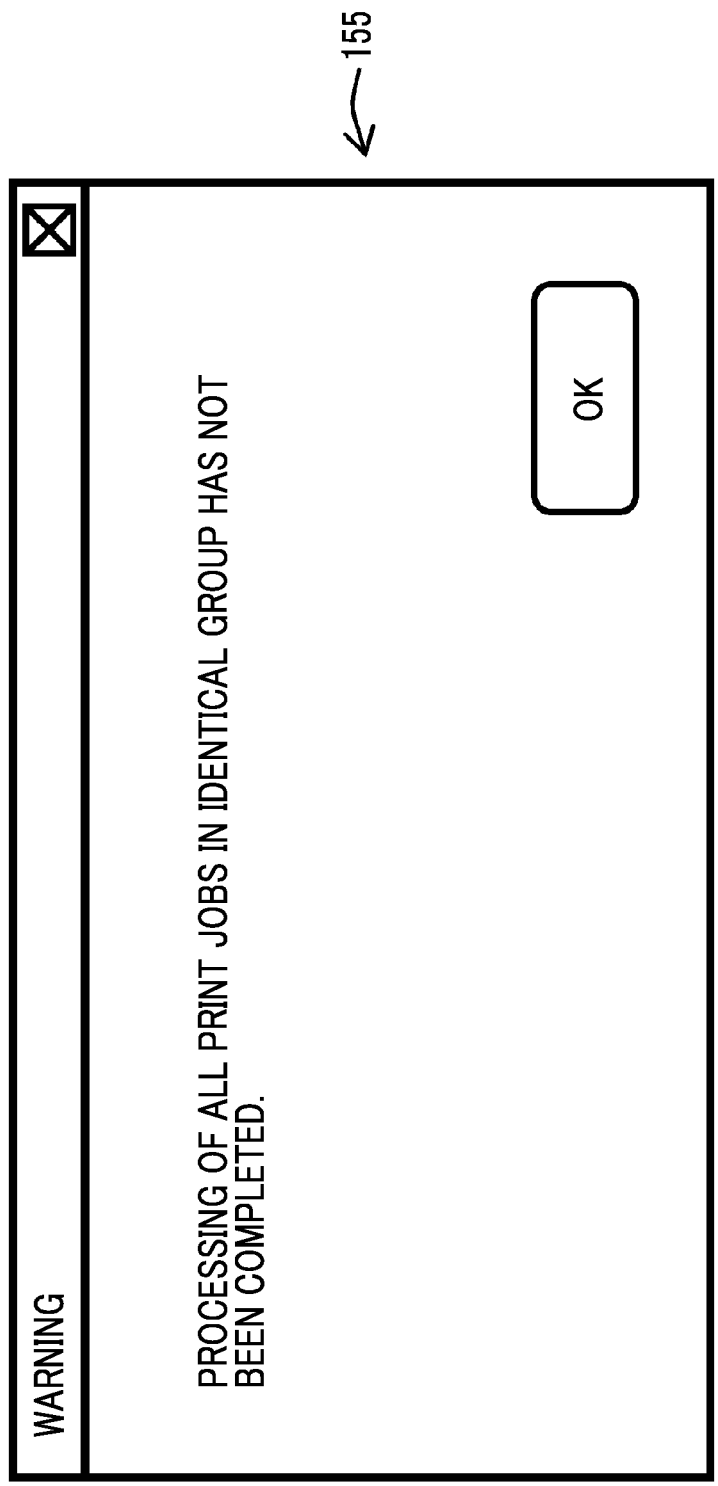
FIG. 15 is a diagram showing an example of a warning screen related to incomplete processing of a group job.

Here, when the operator gives an instruction (request for input of result information) of "group completion report" in the menu 124 of the history screen 111 (see FIG. 6), for example, in a state where the printing processing of all the print jobs in the group is not completed for the group job 47 for which the request presence/absence information 53 is "requested", the printing control apparatus 18 may perform control of the display apparatus 76 of the printing control apparatus 18 to display a warning screen 155 indicating that the printing processing of all the print jobs in the identical group has not been completed, as shown in FIG. 15.

Figure 16:
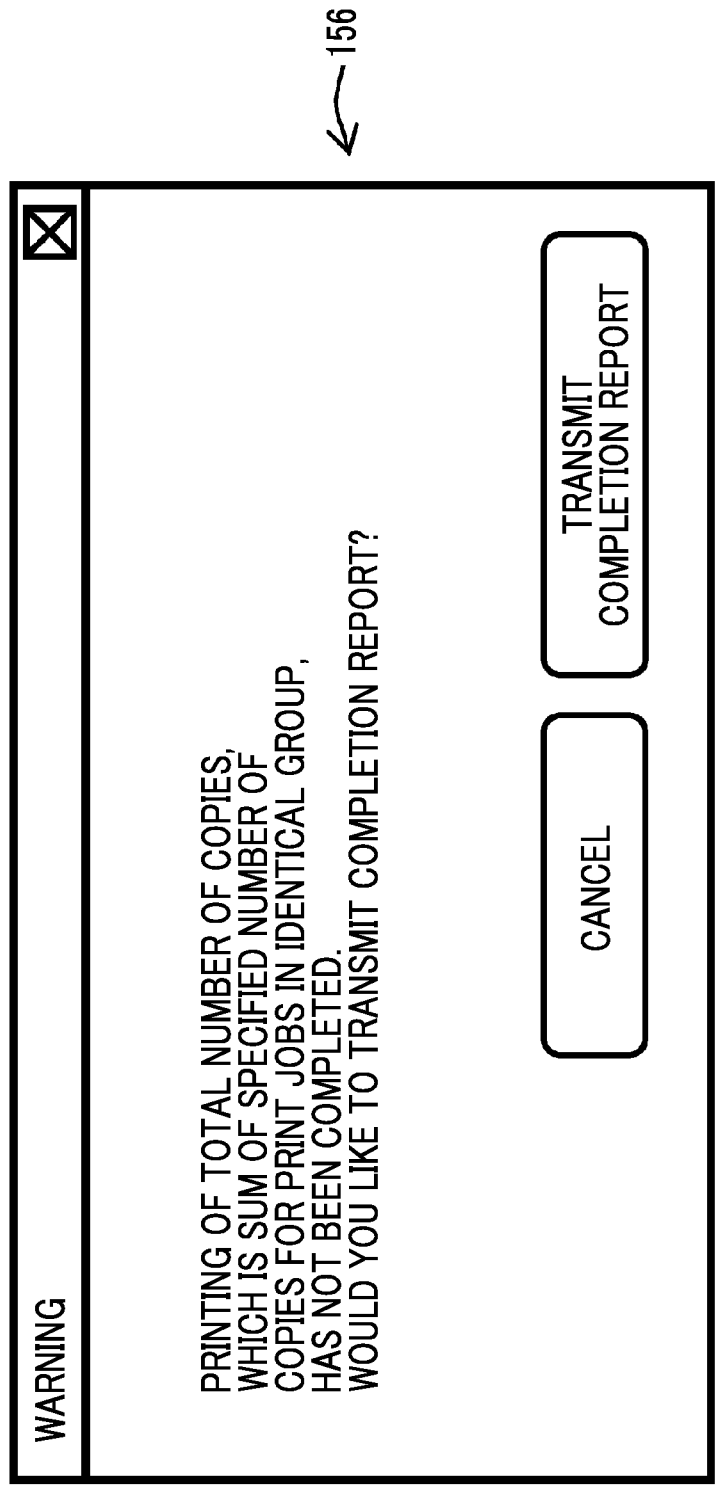
FIG. 16 is a diagram showing an example of a warning screen indicating that a specified number of copies of a group job has not been reached.

Further, when the quantity less than the total number of copies, which is the sum of "total number of copies" ("total number of copies" specified in the attribute information) of all the print jobs in the group for the group job 47 for which the request presence/absence information 53 is "requested" is input to the "number of non-defective products" (see FIG. 10) on the completion report screen 130 shown in FIG. 10 and the "transmission" button 140 is pressed, the printing control apparatus 18 may perform control of the display apparatus 76 of the printing control apparatus 18 to display a warning screen 156 indicating that the printing processing of the total number of copies has not been completed, as shown in FIG. 16. Alternatively, when the quantity less than the total necessary number of copies, which is the sum of the "necessary number of copies" ("necessary number of copies" specified in the attribute information) of all the print jobs in the group, is input to the "number of non-defective products" (see FIG. 10) of the completion report screen 130 shown in FIG. 10, and the "transmission" button 140 is pressed, the printing control apparatus 18 may perform control to display the warning screen 156 as shown in FIG. 16 may be performed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control apparatus comprising:
a processor configured to:
transmit, when a print instruction is received from an operator, a printing processing command based on a print job to a printing apparatus;
receive an instruction for a completion report which includes a completion of the print job;
display, on a screen, a message indicating that the completion report is unnecessary in response to the completion report not being requested;
display, on the screen, information of the completion report in response to the completion report having been request;
receive result information related to a result of an operation of the printing apparatus operating in accordance with the printing processing command from the operator; and
transmit the completion report which includes the result information to a process management apparatus.

2. The printing control apparatus according to claim 1, wherein the print job includes one or more items of the result information that request the operator to input, and
the processor is configured to:
perform control to display each of the items of the result information of the print job on a display apparatus, and
receive information corresponding to each of the items of the result information of the print job from the operator, as the result information.

3. The printing control apparatus according to claim 1, wherein the result information received from the operator includes a stop time and a reason for stop in a stop of the printing apparatus that occurs when the printing apparatus operates in accordance with the printing processing command.

4. The printing control apparatus according to claim 2, wherein the result information received from the operator includes a stop time and a reason for stop in a stop of the printing apparatus that occurs when the printing apparatus operates in accordance with the printing processing command.

5. The printing control apparatus according to claim 1, wherein the result information received from the operator includes the number of sheets consumed without forming a printed product, that is generated when the printing apparatus operates in accordance with the printing processing command.

6. The printing control apparatus according to claim 2, wherein the result information received from the operator includes the number of sheets consumed without forming a printed product, that is generated when the printing apparatus operates in accordance with the printing processing command.

7. The printing control apparatus according to claim 1, wherein the print job includes request presence or absence information indicating whether or not the operator is requested to input the result information, and
the processor is configured to:
perform control, in a case where the request presence or absence information of the print job indicates that there is a request, to display a screen for receiving the result information from the operator on a display apparatus, and
perform control, in a case where the request presence/absence information of the print job indicates that there is no request, not to display the screen on the display apparatus.

8. The printing control apparatus according to claim 7, wherein the processor is configured to:
forcibly set, when the operator changes print setting information of the print job, that affects the operation of the printing apparatus, the request presence or absence information of the print job to be requested.

9. The printing control apparatus according to claim 1, wherein the processor is configured to:
perform control, when the processor receives an instruction from the operator to erase the print job stored in a storage apparatus before receiving the result information from the operator, to display a warning screen indicating that the result information has not been input on a display apparatus.

10. The printing control apparatus according to claim 2, wherein the processor is configured to:
perform control, when the processor receives an instruction from the operator to erase the print job stored in a storage apparatus before receiving the result information from the operator, to display a warning screen indicating that the result information has not been input on the display apparatus.

11. The printing control apparatus according to claim 3, wherein the processor is configured to:
perform control, when the processor receives an instruction from the operator to erase the print job stored in a storage apparatus before receiving the result information from the operator, to display a warning screen indicating that the result information has not been input on a display apparatus.

12. The printing control apparatus according to claim 4, wherein the processor is configured to:
perform control, when the processor receives an instruction from the operator to erase the print job stored in a storage apparatus before receiving the result information from the operator, to display a warning screen indicating that the result information has not been input on the display apparatus.

13. The printing control apparatus according to claim 5, wherein the processor is configured to:

perform control, when the processor receives an instruction from the operator to erase the print job stored in a storage apparatus before receiving the result information from the operator, to display a warning screen indicating that the result information has not been input on a display apparatus.

14. The printing control apparatus according to claim 6, wherein the processor is configured to:

perform control, when the processor receives an instruction from the operator to erase the print job stored in a storage apparatus before receiving the result information from the operator, to display a warning screen indicating that the result information has not been input on the display apparatus.

15. The printing control apparatus according to claim 1, wherein the processor is configured to:

perform control, when the processor receives a request for input of the result information from the operator in a state where the printing apparatus has not completed printing processing of the specified number of sheets for the print job, to display a warning screen indicating that the printing processing has not been completed on a display apparatus.

16. The printing control apparatus according to claim 2, wherein the processor is configured to:

perform control, when the processor receives a request for input of the result information from the operator in a state where the printing apparatus has not completed printing processing of the specified number of sheets for the print job, to display a warning screen indicating that the printing processing has not been completed on the display apparatus.

17. The printing control apparatus according to claim 3, wherein the processor is configured to:

perform control, when the processor receives a request for input of the result information from the operator in a state where the printing apparatus has not completed printing processing of the specified number of sheets for the print job, to display a warning screen indicating that the printing processing has not been completed on a display apparatus.

18. The printing control apparatus according to claim 4, wherein the processor is configured to:

perform control, when the processor receives a request for input of the result information from the operator in a state where the printing apparatus has not completed printing processing of the specified number of sheets for the print job, to display a warning screen indicating that the printing processing has not been completed on the display apparatus.

19. A non-transitory computer readable medium storing a program causing a computer to execute a process comprising:

transmitting a printing processing command based on a print job to a printing apparatus when a print instruction is received from an operator;

receiving an instruction for a completion report which includes a completion of the print job;

displaying, on a screen, a message indicating that the completion report is unnecessary in response to the completion report not being requested;

displaying, on the screen, information of the completion report in response to the completion report having been request;

receiving result information related to result of operation of the printing apparatus operating in accordance with the printing processing command from the operator; and transmitting the completion report which includes the result information to a process management apparatus.

20. A printing control method comprising:

transmitting a printing processing command based on a print job to a printing apparatus when a print instruction is received from an operator;

receiving an instruction for a completion report which includes a completion of the print job;

displaying, on a screen, a message indicating that the completion report is unnecessary in response to the completion report not being requested;

displaying, on the screen, information of the completion report in response to the completion report having been request;

receiving result information related to result of operation of the printing apparatus operating in accordance with the printing processing command from the operator; and transmitting the completion report which includes the result information to a process management apparatus.

\* \* \* \* \*